(12) United States Patent
Chen et al.

(10) Patent No.: US 11,522,243 B2
(45) Date of Patent: Dec. 6, 2022

(54) HERMETIC PACKAGING OF A MICRO-BATTERY DEVICE

(71) Applicant: International Business Machines Corporation, Armonk, NY (US)

(72) Inventors: Qianwen Chen, Chappaqua, NY (US); Jae-Woong Nah, Closter, NJ (US); Bing Dang, Chappaqua, NY (US); Leanna Pancoast, White Plains, NY (US); John Knickerbocker, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 226 days.

(21) Appl. No.: 17/128,371

(22) Filed: Dec. 21, 2020

(65) Prior Publication Data
US 2022/0200086 A1 Jun. 23, 2022

(51) Int. Cl.
*H01M 50/171* (2021.01)
*H01M 10/0585* (2010.01)
*H01M 50/191* (2021.01)
*H01M 50/197* (2021.01)
*H01M 50/186* (2021.01)

(52) U.S. Cl.
CPC ..... *H01M 50/171* (2021.01); *H01M 10/0585* (2013.01); *H01M 50/186* (2021.01); *H01M 50/191* (2021.01); *H01M 50/197* (2021.01)

(58) Field of Classification Search
CPC ............ H01M 50/171; H01M 50/186; H01M 50/191; H01M 50/197; H01M 10/0585

USPC ...................................................... 429/174
See application file for complete search history.

(56) References Cited

U.S. PATENT DOCUMENTS

| | | | |
|---|---|---|---|
| 6,190,798 B1 | 2/2001 | Okada et al. | |
| 7,727,601 B2 | 6/2010 | Burrows et al. | |
| 7,846,579 B2 | 12/2010 | Krasnov et al. | |
| 8,420,252 B2 | 4/2013 | Shakespeare et al. | |
| 8,911,897 B2 | 12/2014 | Bedjaoui et al. | |
| 8,999,571 B2 | 4/2015 | Chiang et al. | |
| 2002/0071989 A1 | 6/2002 | Verma et al. | |
| 2009/0136839 A1 | 5/2009 | Kraznov | |
| 2009/0181298 A1* | 7/2009 | Farrell | H01M 50/54 219/121.64 |
| 2010/0291431 A1 | 11/2010 | Shih et al. | |

(Continued)

OTHER PUBLICATIONS

International Search Report and Written Opinion for Application GB2117435.4, dated May 31, 2022, 8 pages.

*Primary Examiner* — James M Erwin
(74) *Attorney, Agent, or Firm* — Jeffrey M. Ingalls

(57) ABSTRACT

A method of manufacturing a micro-battery is provided. The method includes forming a micro-battery device by forming a first metal anode via and a first metal cathode via in a first substrate, forming a first metal layer on a bottom side of the first substrate, forming a first battery element on a top side of the substrate, forming an encapsulation layer around the first battery element, forming trenches through the encapsulation layer and the first substrate on different sides of the first battery element, and forming a metal sealing layer in the trenches to cover at least a plurality of sidewall surfaces of the first battery element. The metal sealing layer is electrically connected to the battery element through the first metal layer and the first metal cathode via.

20 Claims, 16 Drawing Sheets

(56) References Cited

U.S. PATENT DOCUMENTS

2012/0118741 A1* 5/2012 Tucholski ............... H01M 6/40
                                                          204/630
2015/0102530 A1   4/2015 Wallace et al.
2017/0162911 A1   6/2017 Gaben

* cited by examiner

HERMETIC PACKAGING OF A MICRO-BATTERY DEVICE

BACKGROUND

The present disclosure relates to a micro-battery, and in particular relates to a hermetic sealing structure (i.e., packaging) for a micro-battery using a metal seal.

Hermetic sealing of a micro-battery device may be desirable to prevent or minimize the possibility of the leakage of battery materials outside of the battery packaging. In certain micro-battery devices, sealing of the micro-battery is achieved using a polymeric material, which may not be sufficient to obtain hermeticity. Also, certain sealing structures for micro-battery devices may include a metallic sealing layer. However, this metallic sealing layer may not hermetically seal all sides of the micro-battery device, which can permit a leakage path from one or more sides of the micro-battery device. In addition, certain micro-battery devices include an anode and a cathode on a same side of the device, which can complicate the parallel or series connections of multiple micro-battery devices.

SUMMARY

Embodiments of the present disclosure relate to methods of manufacturing micro-battery devices. In certain embodiments, the method includes forming a micro-battery device by forming a first metal anode via and a first metal cathode via in a first substrate, forming a first metal layer on a bottom side of the first substrate, forming a first battery element on a top side of the substrate, forming an encapsulation layer around the first battery element, forming trenches through the encapsulation layer and the first substrate on different sides of the first battery element, and forming a metal sealing layer in the trenches to cover at least a plurality of sidewall surfaces of the first battery element. The metal sealing layer is electrically connected to the battery element through the first metal layer and the first metal cathode via.

Other embodiments relate to a micro-battery apparatus comprising a first micro-battery device including a first substrate. The first substrate includes a first metal anode via and a first metal cathode via. The first micro-battery device also includes a first battery element formed on the substrate, the first battery element including a first cathode current collector, a first anode current collector, a first cathode and a first anode. The first cathode current collector is electrically connected to the first cathode through the first metal cathode via, wherein the first anode current collector is electrically connected to the first anode through the first metal anode via. A metal sealing layer is formed on at least sidewall surfaces of the first battery element, and the metal sealing layer is electrically connected to the first cathode.

Other embodiments relate to a micro-battery apparatus comprising a micro-battery device. The micro-battery device includes a first substrate including a first metal anode via and a first metal cathode via. A first battery element is formed on the first substrate, the first battery element including a first cathode current collector, a first anode current collector, a first cathode and a first anode. The first cathode current collector is electrically connected to the first cathode through the first metal cathode via, and the first anode current collector is electrically connected to the first anode through the first metal anode via. A second substrate is formed on the first battery element and includes a second metal anode via and a second metal cathode via. A second battery element is formed on the second substrate, the second battery element including a second cathode current collector, a second anode current collector, a second cathode and a second anode. The second cathode current collector is electrically connected to the second cathode through the second cathode via, and the second anode current collector is electrically connected to the second anode through the second anode via. The micro-battery device also includes a metal interconnect that electrically connects the first anode to the second anode, and a metal sealing layer formed on sidewall surfaces of the first and second battery elements. The metal sealing layer is electrically connected to the first cathode and the second cathode.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, explain the principles of the disclosure. The drawings are only illustrative of certain embodiments and do not limit the disclosure.

Figure 1A:
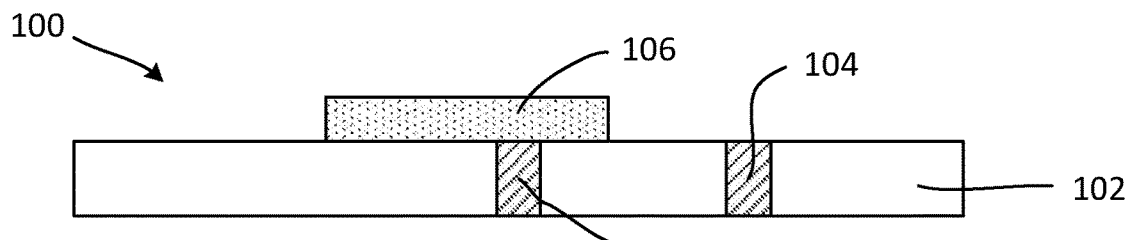
FIG. 1A is a cross-sectional view depicting a micro-battery device at an intermediate stage of the manufacturing process, according to embodiments.

It should be appreciated that elements in the figures are illustrated for simplicity and clarity. Well-understood elements that may be useful or necessary in a commercially feasible embodiment may not be shown for the sake of simplicity and to aid in the understanding of the illustrated embodiments.

DETAILED DESCRIPTION

The present disclosure describes embodiments of micro-battery devices and methods of manufacturing micro-battery devices that include a metallic hermetic sealing layer. The drawings of the present application are provided for illustrative purposes and, as such, the drawings may not be drawn to scale.

Various embodiments of the present disclosure are described herein with reference to the related drawings. Alternative embodiments can be devised without departing from the scope of the present disclosure. It is noted that various connections and positional relationships (e.g., over, below, adjacent, etc.) are set forth between elements in the following description and in the drawings. These connections and/or positional relationships, unless specified otherwise, can be direct or indirect, and the present disclosure is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on" or "positioned atop" mean that a first element, such as a first structure, is present on a second element, such as a second structure, wherein intervening elements such as an interface structure can be present between the first element and the second element. The term "direct contact" means that a first element, such as a first structure, and a second element, such as a second structure, are connected without any intermediary conducting, insulating or semiconductor layers at the interface of the two elements. It should be noted, the term "selective to," such as, for example, "a first element selective to a second element," means that a first element can be etched, and the second element can act as an etch stop.

For the sake of brevity, conventional techniques related to micro-battery device and/or integrated circuit (IC) fabrication may or may not be described in detail herein. Moreover, the various tasks and process steps described herein can be incorporated into a more comprehensive procedure or process having additional steps or functionality not described in detail herein. In particular, various steps in the manufacture of micro-battery devices and/or ICs are well known and so, in the interest of brevity, many conventional steps will only be mentioned briefly herein or will be omitted entirely without providing the well-known process details.

In general, the various processes used to form a micro-battery device fall into four general categories, namely, film deposition, removal/etching/laser milling, patterning/lithography, injection molded soldering (IMS).

Deposition is any process that grows, coats, or otherwise transfers a material onto the wafer. Available technologies include physical vapor deposition (PVD), chemical vapor deposition (CVD), electrochemical deposition (ECD), molecular beam epitaxy (MBE) and more recently, atomic layer deposition (ALD), and spin-coating among others. Another deposition technology is plasma enhanced chemical vapor deposition (PECVD), which is a process which uses the energy within the plasma to induce reactions at the wafer surface that would otherwise require higher temperatures associated with conventional CVD. Energetic ion bombardment during PECVD deposition can also improve the film's electrical and mechanical properties.

Removal/etching is any process that removes material from the wafer. Examples include etch processes (either wet or dry), chemical-mechanical planarization (CMP), laser milling, and the like. One example of a removal process is ion beam etching (IBE). In general, IBE (or milling) refers to a dry plasma etch method which utilizes a remote broad beam ion/plasma source to remove substrate material by physical inert gas and/or chemical reactive gas means. Like other dry plasma etch techniques, IBE has benefits such as etch rate, anisotropy, selectivity, uniformity, aspect ratio, and minimization of substrate damage. Another example of a dry removal process is reactive ion etching (RIE). In general, RIE uses chemically reactive plasma to remove material deposited on wafers. With RIE the plasma is generated under low pressure (vacuum) by an electromagnetic field. High-energy ions from the RIE plasma attack the wafer surface and react with it to remove material. Laser milling or laser beam machining (LBM) is a form of machining in which a laser is directed towards the work piece for machining. This process uses thermal energy to remove material from metallic or nonmetallic surfaces. The high frequency of monochromatic light on the surface of the object melts and vaporizes the material allowing for selective removal of the portion of the object.

Lithography is the formation of three-dimensional relief images or patterns on the substrate for subsequent transfer of the pattern to the substrate. In lithography, the patterns are formed by a light sensitive polymer called a photo-resist. To build the complex structures that make up an electronic device, lithography and etch pattern transfer steps are repeated multiple times. Each pattern being printed on the wafer is aligned to the previously formed patterns and gradually the conductors, insulators and other regions are built up to form the final device.

Turning now to an overview of technologies that are more specifically relevant to aspects of the present disclosure, in certain embodiments, injection molded soldering (IMS) is utilized to form the metallic hermetic sealing structure for the micro-battery. In general, IMS refers to a metal deposition process in which molten solder is directly injected into holes (or spaces) (e.g., as patterned in photoresist mask films), as opposed to conventional electroplating techniques. For example, an IMS deposition head provides the molten solder (e.g., SAC305 which is a lead-free alloy that contains 96.5% tin, 3% silver, and 0.5% copper) on one side of the patterned wafer, and is then scanned to the other side of the wafer to complete the solder injection into holes (or spaces) therein.

Referring now to FIGS. 1A-1K of the drawings in which like numerals represent the same or similar elements and initially to FIG. 1A, a cross-sectional view of a portion of a micro-battery 100 at an intermediate stage of the manufacturing process is shown. As shown in FIG. 1, a bottom substrate or first substrate 102 is provided. The first substrate 102 can be a flexible substrate. Vias 104 are formed into the first substrate 102 and then filled with a conductive metal material. An anode current collector 106 is formed on a left one of the vias 104. The anode current collector 106 may be a single layer, or a plurality of layers. In one example, the anode current collector 106 includes at least one conductive metallic material such as, for example, titanium or platinum. In one embodiment of the present application, the anode current collector 106 is composed of titanium. In other embodiments, anode current collector 106 includes any metal such as, for example, nickel, copper, or zinc. The anode current collector may have a thickness from 10 nm to 20,000 nm, or any other suitable thickness.

Figure 1B:
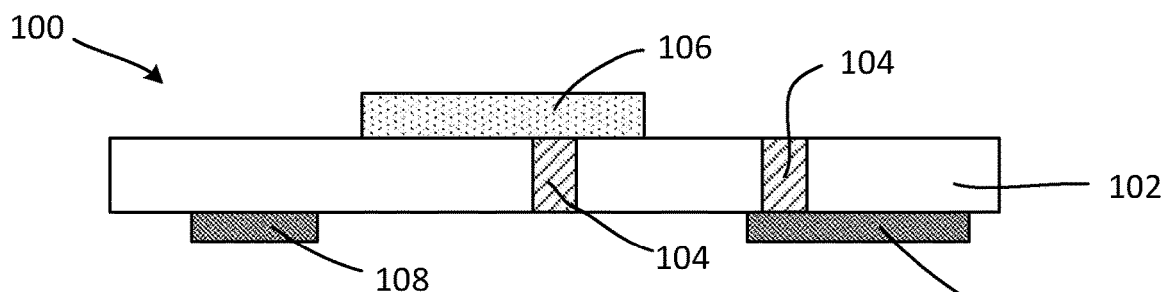
FIG. 1B is a cross-sectional view of the micro-battery device of FIG. 1A after additional fabrication operations, according to embodiments.

Referring now to FIG. 1B, a first metal layer 108 is formed on a back side (or bottom side) of the first substrate 102. The first metal layer 108 includes at least a portion on the left side of the first substrate 102, where at least a portion thereof is positioned to the left of the anode current collector 106. The first metal layer 108 also includes a portion on the right side of the first substrate 102 that is formed in direct contact with the right one of the vias 104.

Figure 1C:
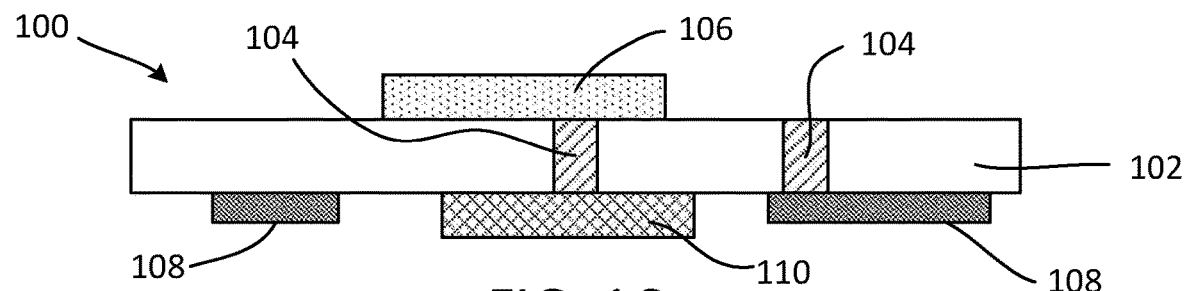
FIG. 1C is a cross-sectional view of the micro-battery device of FIG. 1B after additional fabrication operations, according to embodiments.

Referring now to FIG. 1C, an anode 110 is also formed on the bottom side of the first substrate 102 and electrically connected with the anode current collector 106 through the left one of the vias 104. The anode 110 may be a single layer, or a plurality of layers. In one example, the anode 110 is composed of a material stack of a layer of titanium, a layer of nickel on a surface of the layer of titanium, and a layer of zinc on a surface of the layer of nickel (i.e., Ti/Ni/Zn stack).

Figure 1D:
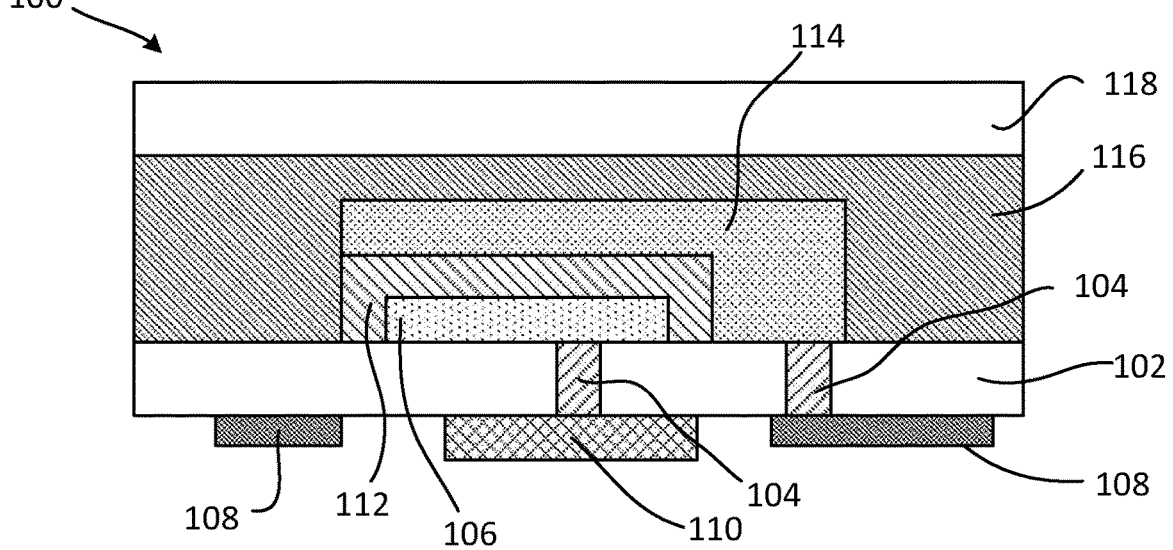
FIG. 1D is a cross-sectional view of the micro-battery device of FIG. 1C after additional fabrication operations, according to embodiments.

Referring now to FIG. 1D, the remainder of the micro-battery device 100 is fabricated. A battery element 112 is formed to cover the entire anode current collector 106 and to also cover portions of the first substrate 102. It should be appreciated that the battery element 112 may includes any suitable number of layers or other battery components. A cathode current collector 114 is formed to cover the entire battery element 112 and to also cover portions of the first substrate 102. In particular, the cathode current collector 114 directly contacts the right one of the vias 104, thus creating a conductive pathway from the cathode current collector 114 to the right one of the vias 108, and to the right side portion of the first metal layer 108. An encapsulating layer 116 is formed to cover the cathode current collector 114 and all other exposed portions of the substrate. In certain embodiments, the encapsulating layer 116 is an insulating material. Finally, a second substrate 118 is formed to cover the encapsulating layer 116. The second substrate 118 may be made of the same materials as the first substrate 102 or different materials and may comprise several sublayers. At this stage of the manufacturing process, the left side portion of the first metal layer 108 is not electrically connected to any other portion of the micro-battery 100 device.

Figure 1E:
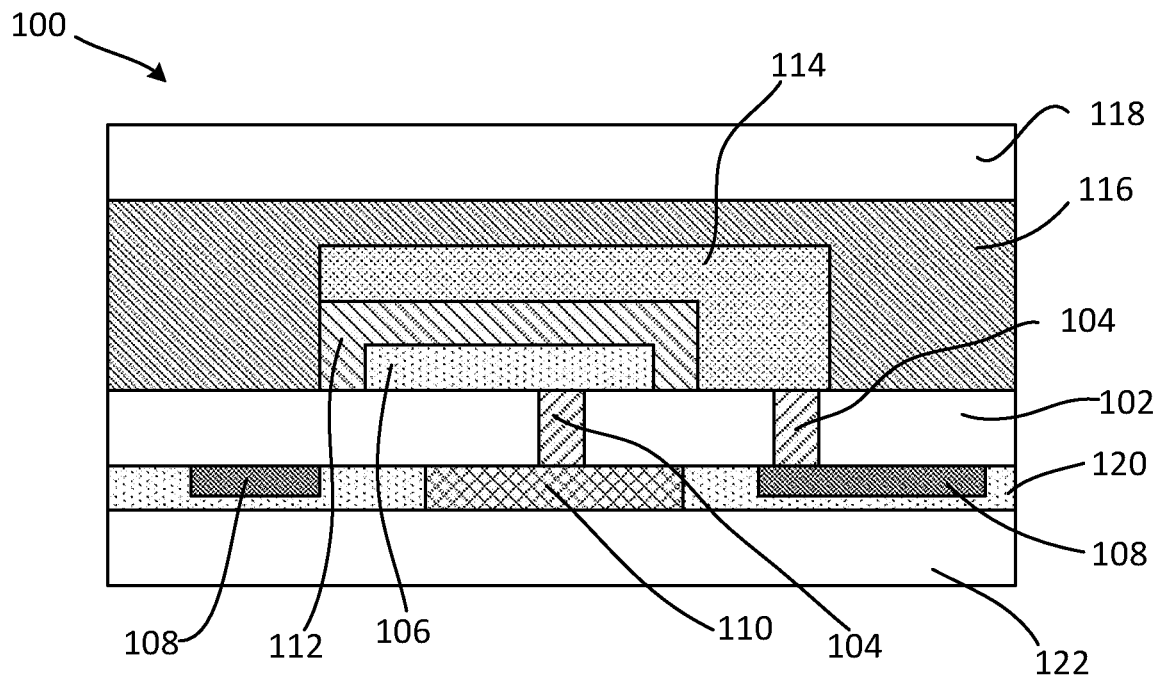
FIG. 1E is a cross-sectional view of the micro-battery device of FIG. 1D after additional fabrication operations, according to embodiments.

Referring now to FIG. 1E, an adhesive layer 120 is formed on the bottom side of the first substrate 102, and a handler substrate 122 is stacked on the adhesive layer. Both the adhesive layer 120 and the handler substrate 122 are temporary structures that facilitate further fabrication of the device, and that will be subsequently removed as described in detail below.

Figure 1F:
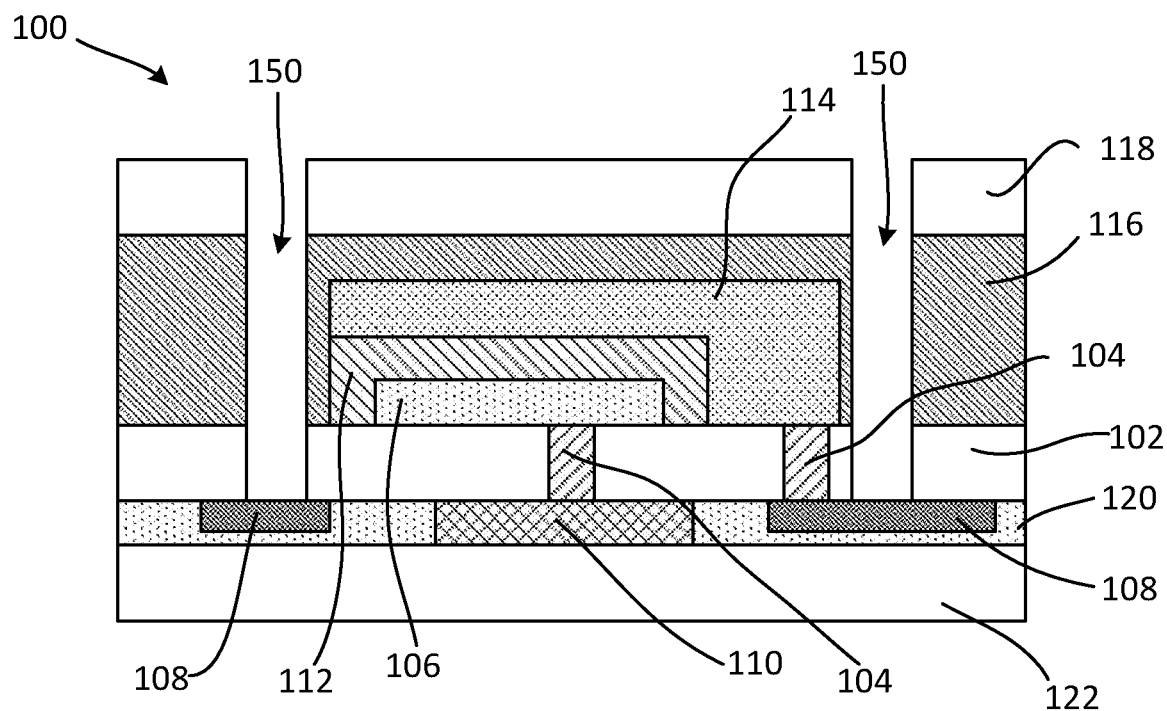
FIG. 1F is a cross-sectional view of the micro-battery device of FIG. 1E after additional fabrication operations, according to embodiments.

Referring now to FIG. 1F, trenches 150 are formed by, for example, a laser milling process using the first metal layer 108 as a stop layer (i.e., the removal of the layers is stopped when the laser reaches the first metal layer 108).

Figure 1G:
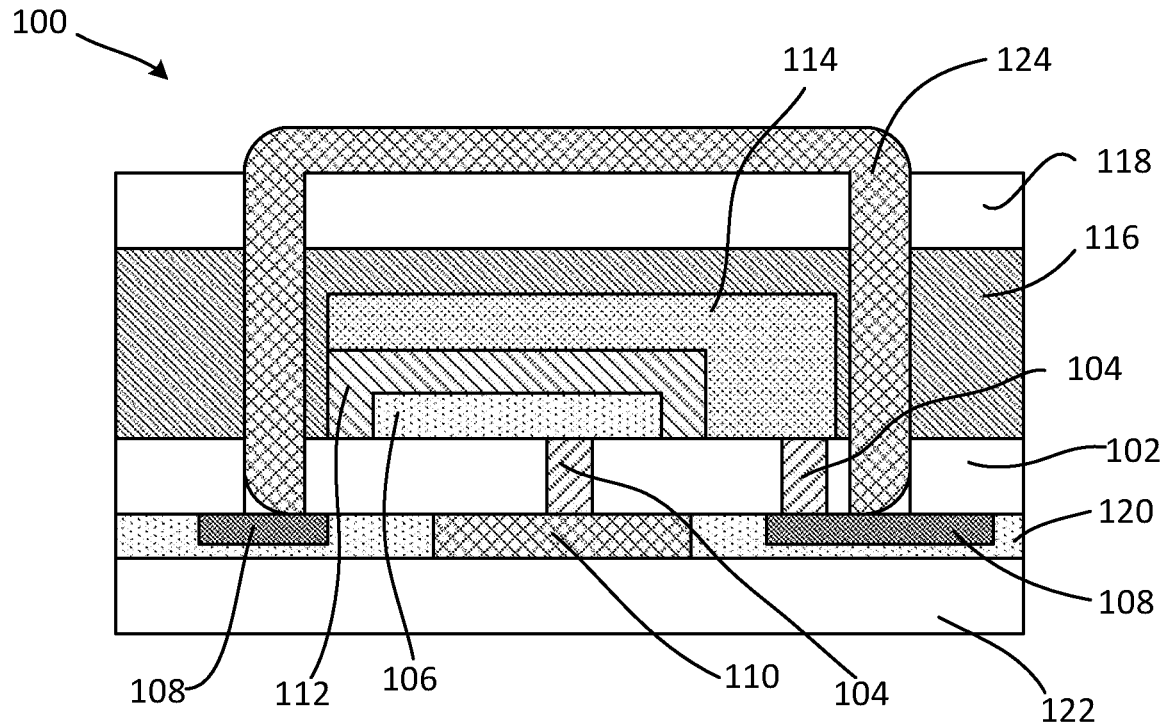
FIG. 1G is a cross-sectional view of the micro-battery device of FIG. 1F after additional fabrication operations, according to embodiments.

Referring now to FIG. 1G, a metal seal 124 is formed to fill in the trenches 150 and on top of the second substrate 118. Thus, the metal seal 124 covers and hermetically seals the entire side surfaces as well as the top surface of the micro-battery 100 device. In certain embodiments, the metal seal 124 is formed by injection molded soldering (IMS), which is a metal deposition process in which molten solder is directly injected into the trenches 150. As shown in FIG. 1G, the metal seal 124 contacts both the right and left sides of the first metal layer 108, thus creating a conducting pathway from the cathode current collector 114, to the right side via 104, to the right side of the first metal layer 108, through the metal seal 124, and finally to the left side of the first metal layer 108. It could be considered that the cathode includes both the right and left sides of the first metal layer 108 as well as the metal seal 124. Thus, the top portion of the metal seal 124 (i.e., the portion covering the second substrate 118) functions as a cathode on the top side of the micro-battery 100, and the anode 110 is on the bottom side of the micro-battery 100. Having the cathode and the anode on opposite sides of the micro-battery 100 can facilitate a less complicated series connection of multiple micro-batteries 100, as described in detail below with respect to FIG. 1J, and also facilitate a less complicated parallel connection of multiple micro-batteries 100, as described in detail below with respect to FIG. 1K.

Figure 1H:
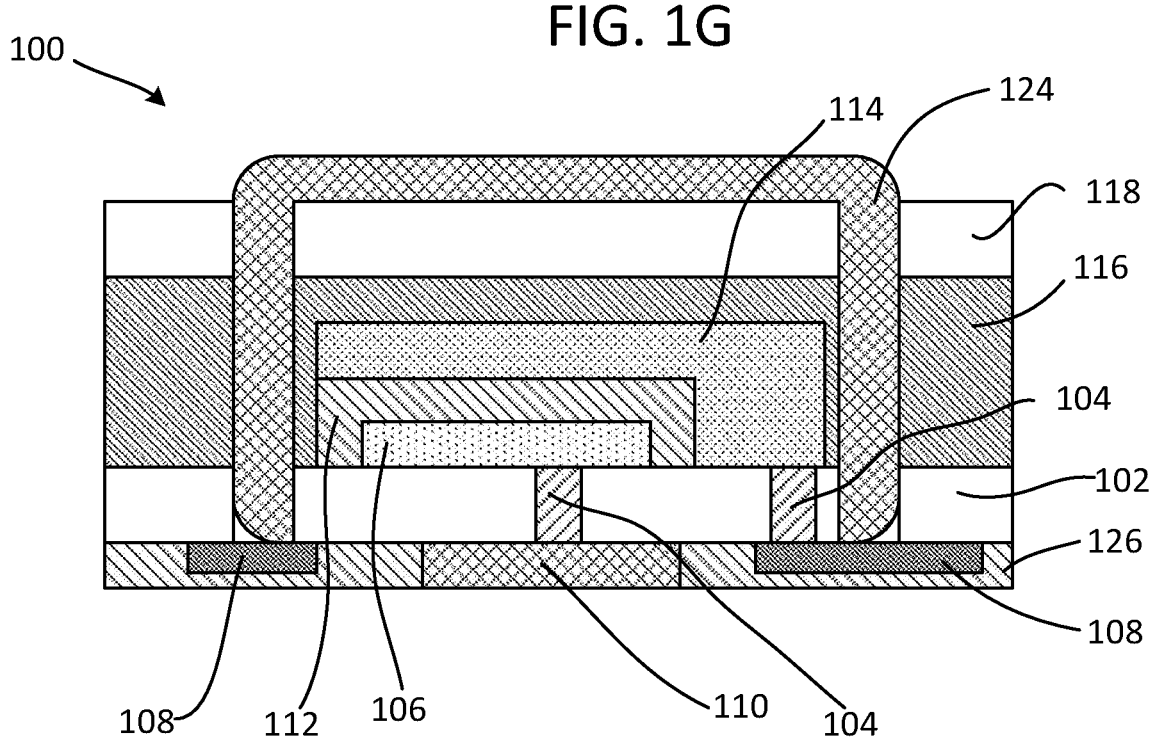
FIG. 1H is a cross-sectional view of the micro-battery device of FIG. 1G after additional fabrication operations, according to embodiments.

Referring now to FIG. 1H, the handler substrate 122 and the adhesive layer 120 are removed, and then a first insulator layer 126 is formed on the bottom side of the first substrate 102. In certain embodiments, a laser ablation process or etching process can be used to remove the adhesive layer 120 and the handler substrate 122. In certain embodiments, the first insulator layer 126 may be comprised of an insulating polymer material, and electrically separates the anode side of the micro-battery 100 from the cathode side of the micro-battery 100. For example, insulating material of the first insulator layer 126 is positioned between the anode 110 and the right side portion of the first metal layer 108 (i.e., which can function as part of the cathode). As shown in FIG. 1H, the first insulator layer 126 is formed to be thick enough to cover all exposed surfaces of the first metal layer 108, while still leaving the bottom surface side of the anode 110 exposed. In certain embodiments, the thickness of the anode 110 is thicker than the first insulator layer 120.

Figure 1I:
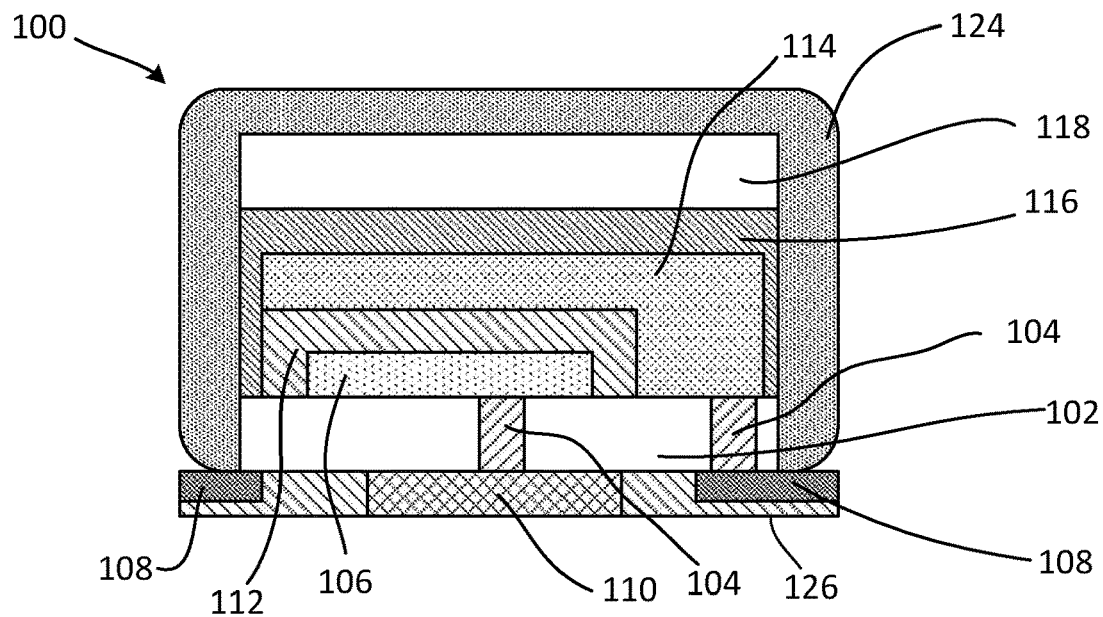
FIG. 1I is a cross-sectional view of the micro-battery device of FIG. 1H after additional fabrication operations, according to embodiments.

Referring now to FIG. 1I, there is illustrated the micro-battery 100 structure after singulation. In general, where a plurality of micro-batteries are manufactured on a common substrate, singulation refers to the process of separating or dividing these devices into individual micro-batteries. In certain embodiments, singulation includes removing portions of the first substrate 102, the encapsulating layer 116, the second substrate 118, first metal layer 108 and the first insulator layer 126 outside of (i.e., to the right and the left of) the metal seal 124 to provide the micro-battery 100. In one embodiment, a laser milling process can be used to perform the singulation. In another embodiment, sawing is used to separate the individual micro-battery 100 devices.

Figure 1J:
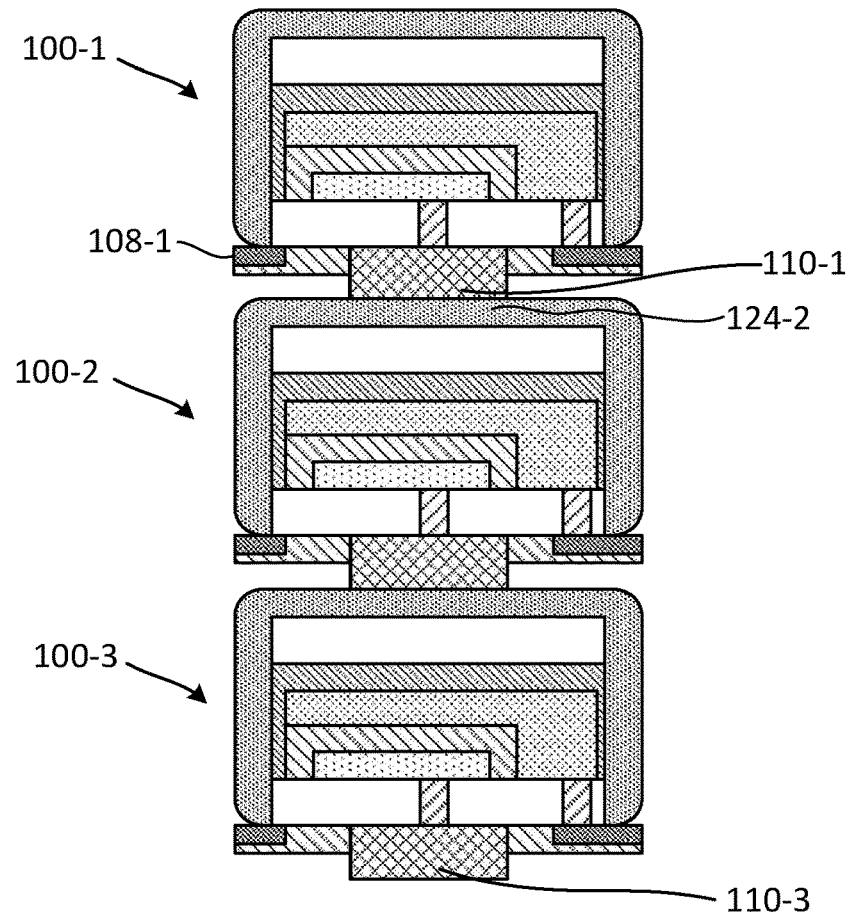
FIG. 1J is a cross-sectional view of several of the micro-battery devices of FIG. 1I electrically connected in series, according to embodiments.

Referring now to FIG. 1J, three different micro-batteries 100-1, 100-2 and 100-3 are shown to be connected in series. In this example for series battery connection, the first metal layer 108-1 of micro-battery 100-1 may be connected to the anode 110-3 of micro-battery 100-3 (not shown). In certain embodiments, the anode 110-1 of a first micro-battery 100-1 contacts the upper portion of the metal seal 124-2 of the second micro-battery 100-2. Although not illustrated in FIG. 1J for the sake of simplicity, the same type of series electrical connection occurs between the second micro-battery 100-2 and the third micro-battery 100-3.

Figure 1K:
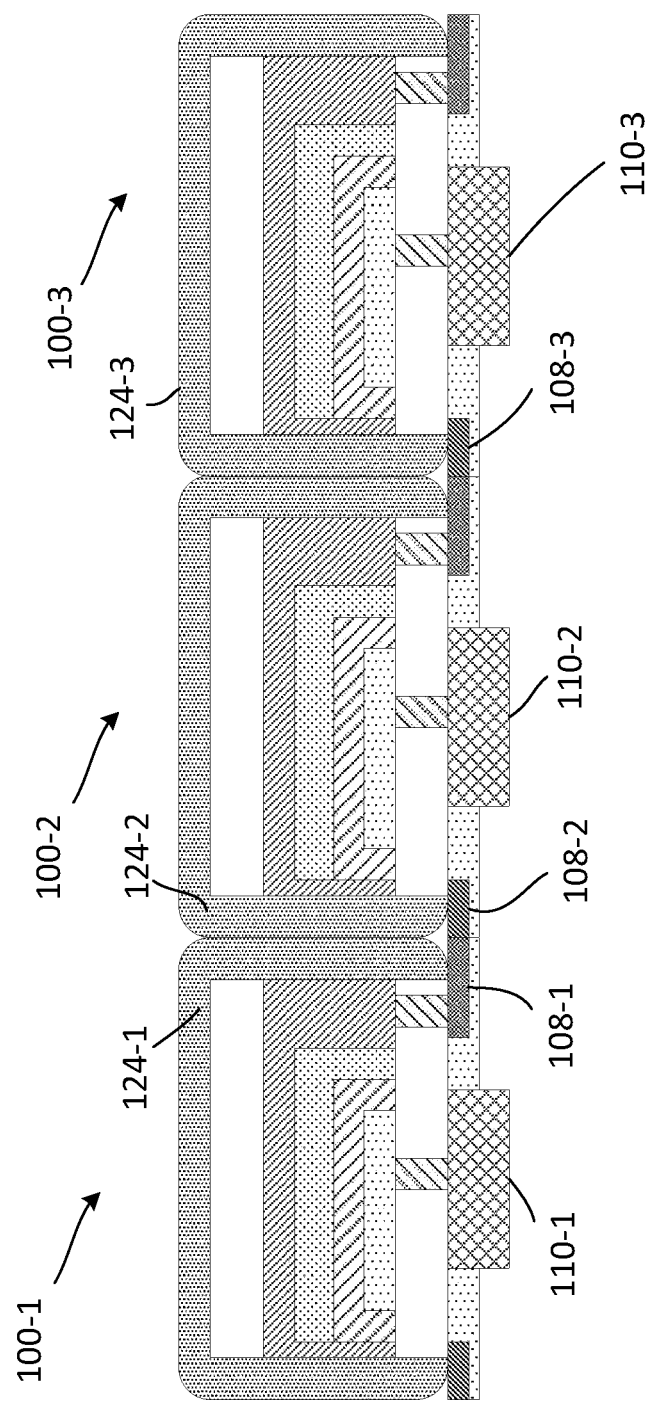
FIG. 1K is a cross-sectional view of several of the micro-battery devices of FIG. 1I electrically connected in parallel, according to embodiments.

Referring now to FIG. 1K, three different micro-batteries 100-1, 100-2 and 100-3 are shown to be connected in parallel. In this example for parallel battery connection, an electrical connection (not shown) for the cathodes could be made through any of the first metal layer 108-1 of micro-battery 100-1, the first metal layer 108-2 of micro-battery 100-2 and the first metal layer 108-3 of the micro-battery 100-3 since they are all electrically connected through the respective metal seals 124-1, 124-2 and 12403. Moreover, an electrical connection (not shown) may be needed to connect all three anodes 110-1, 110-2 and 110-3 in the parallel battery circuit. In certain embodiments, the metal seal 124-1 of a first micro-battery 100-1 contacts the left side portion of the metal seal 124-2 of the second micro-battery 100-2. Although not illustrated in FIG. 1K for the sake of simplicity, the same type of parallel electrical connection occurs between the second micro-battery 100-2 and the third micro-battery 100-3.

Figure 2A:
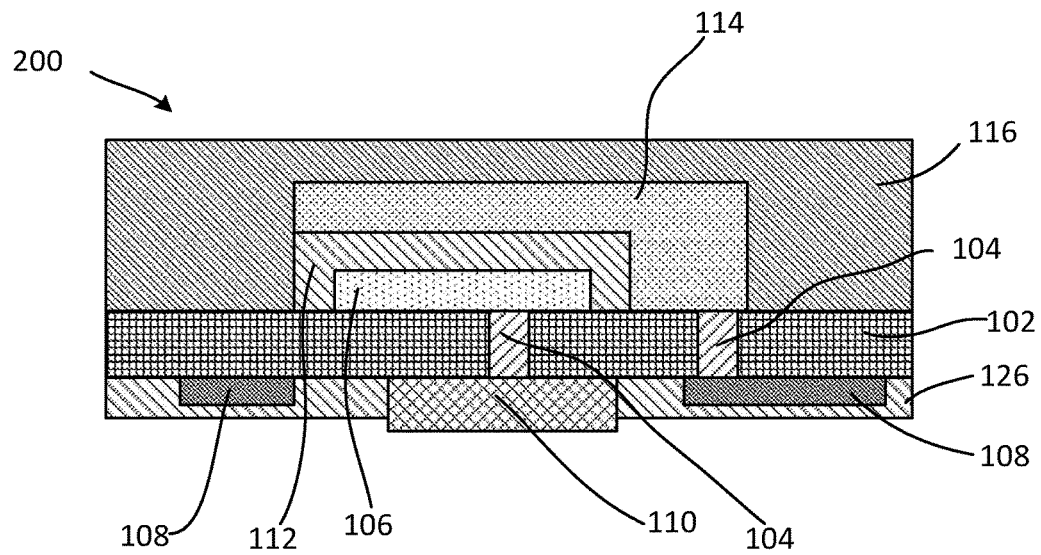
FIG. 2A is a cross-sectional view depicting a single layer of a multi-layer micro-battery device at an intermediate stage of the manufacturing process, according to embodiments.

Referring now to FIGS. 2A-2G, and initially to FIG. 2A, an embodiment of a two layer integrated solid state micro-battery 250 is shown. The single layer micro-battery 200 shown in FIG. 2A is shown in an intermediate stage of the manufacturing process, and it is similar to the micro-battery 100 shown in FIG. 1D in most respects. Thus, the description of the manufacturing steps of FIGS. 1A-1D will not be repeated for these embodiments. One difference between the micro-battery stack 200 of FIG. 2A and the micro-battery of FIG. 1D is that the second substrate 118 shown in FIG. 1D is not included. Another difference is the inclusion of the polymer insulator layer 126 in FIG. 2A. The polymer insulator layer in FIG. 2A may be the same or similar to the insulator layer 126 shown in FIG. 1H. This somewhat modified structure of the single layer micro-battery stack 200 allows for the connection of two different battery stacks, as described below with respect to FIG. 2B.

Figure 2B:
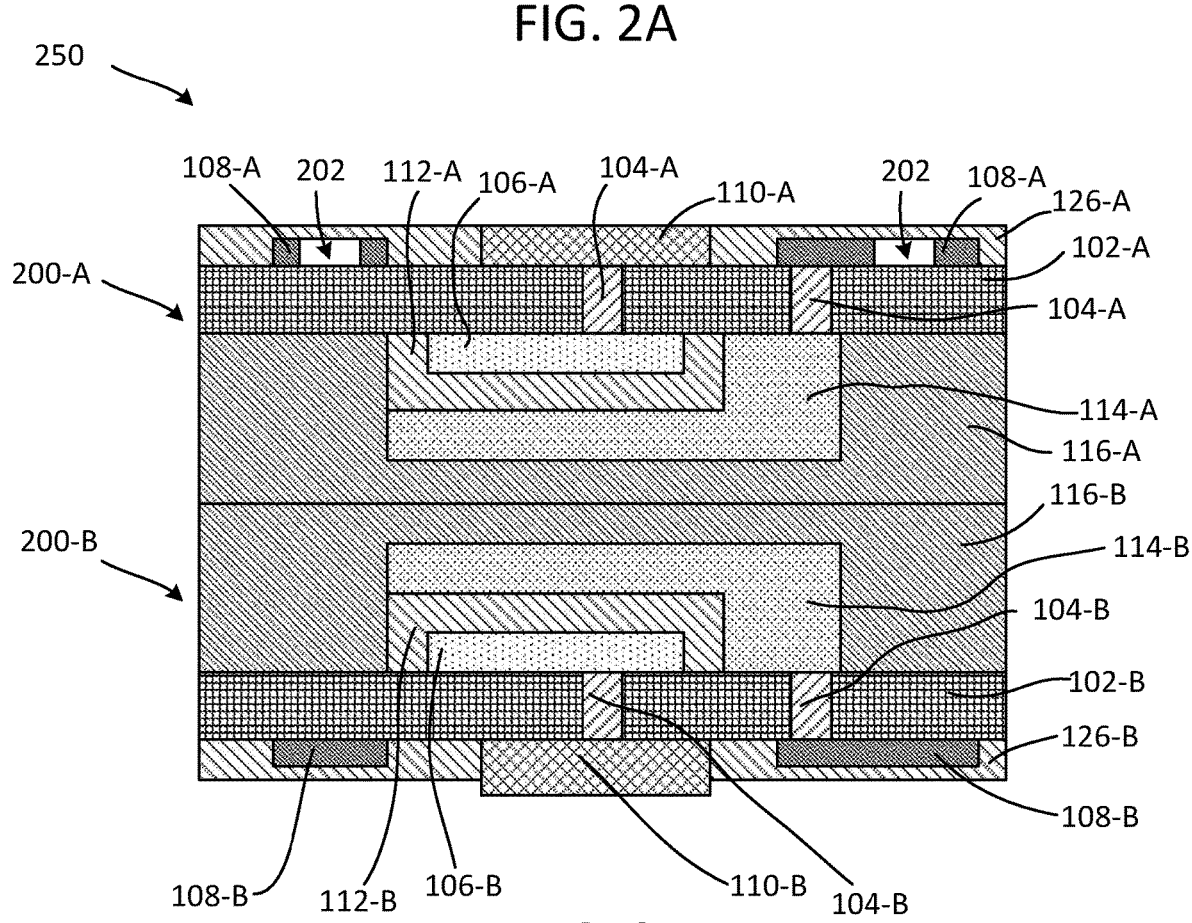
FIG. 2B is a cross-sectional view of a multi-layer micro-battery device including the single layer of FIG. 2A, and after additional fabrication operations, according to embodiments.

Referring now to FIG. 2B, a first micro-battery stack 200-A is joined to a second micro-battery stack 200-B to form the micro-battery 250 device. The first micro-battery stack 200-A includes a first battery stack substrate 102-A, first battery stack vias 104-A, a first battery stack anode current collector 106-A, a first battery stack metal layer 108-A, a first battery stack anode 110-A, a first battery stack battery element 112-A, a first battery stack cathode current collector 114-A, a first battery stack encapsulating layer 116-A, and a first battery stack insulating layer 126-A. Similarly, the second micro-battery stack 200-B includes a second battery stack substrate 102-B, second battery stack vias 104-B, a second battery stack anode current collector 106-B, a second battery stack metal layer 108-B, a second battery stack anode 110-B, a second battery stack battery element 112-B, a second battery stack cathode current collector 114-B, a second battery stack encapsulating layer 116-B, and a second battery stack insulating layer 126-B.

As shown in FIG. 2B, the first battery stack 200-A is inverted (i.e., upside down) with respect to the second battery stack 200-B so that the first battery stack encapsulating layer 116-A is formed in direct contact with the second battery stack encapsulating layer 116-B. However, it should be appreciated that other layers (e.g., an adhesive layer) may be formed between the first battery stack encapsulating layer 116-A and the second battery stack encapsulating layer 116-B. Moreover, in certain embodiments, the first battery stack metal layer 108-A is patterned somewhat differently than the second battery stack metal layer 108-B. In this regard, there are first openings 202 in the first battery stack metal layer 108-A to allow for subsequent laser milling operations, as discussed below with respect to FIG. 2D.

Figure 2C:
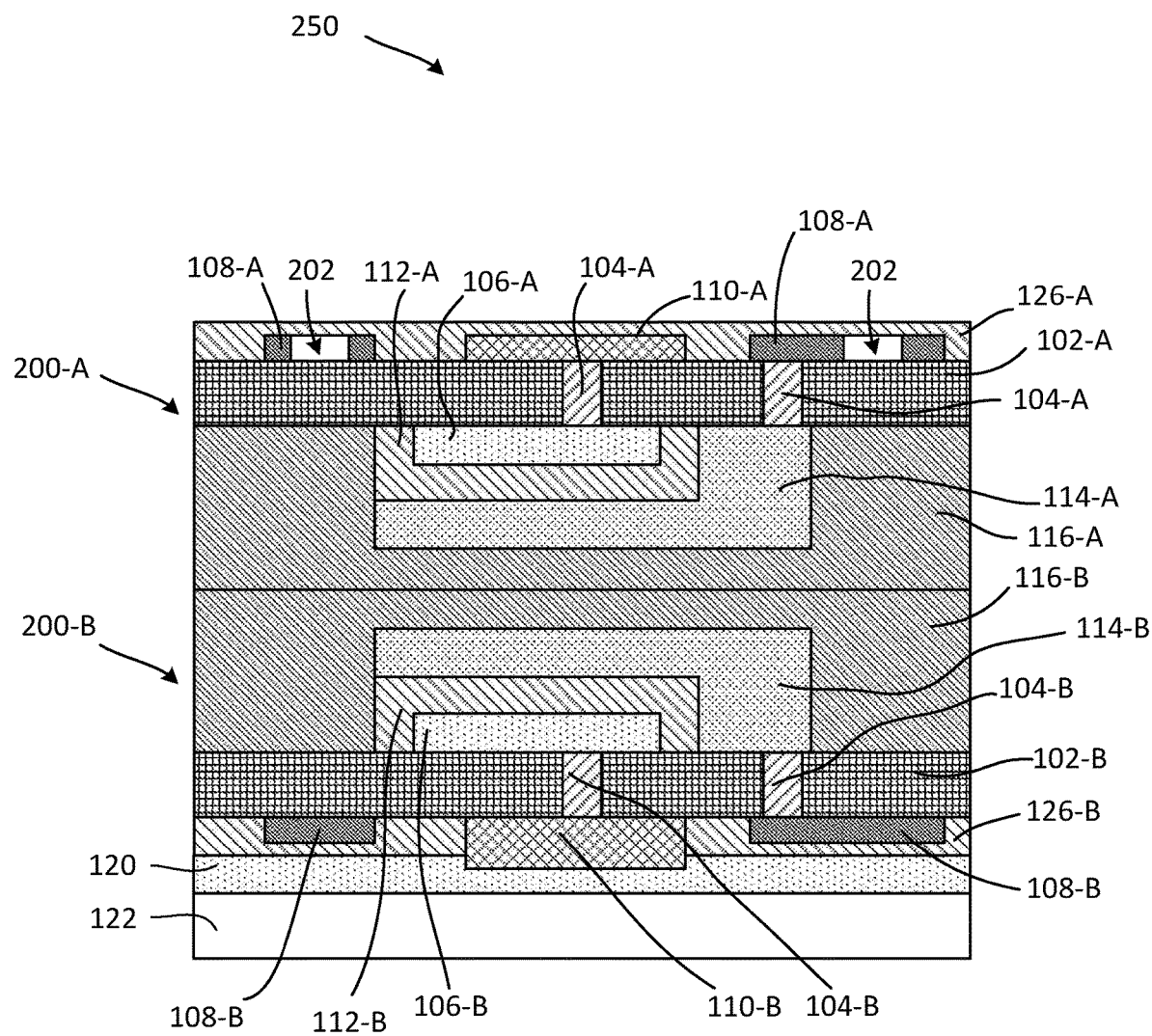
FIG. 2C is a cross-sectional view of the micro-battery device of FIG. 2B after additional fabrication operations, according to embodiments.

Referring now to FIG. 2C, a handler substrate 122 is attached to the first battery stack 200-B with an adhesive layer 120. The handler substrate 122 may be the same type or a different type of substrate that is discussed above with respect to the FIGS. 1A-1K embodiments.

Figure 2D:
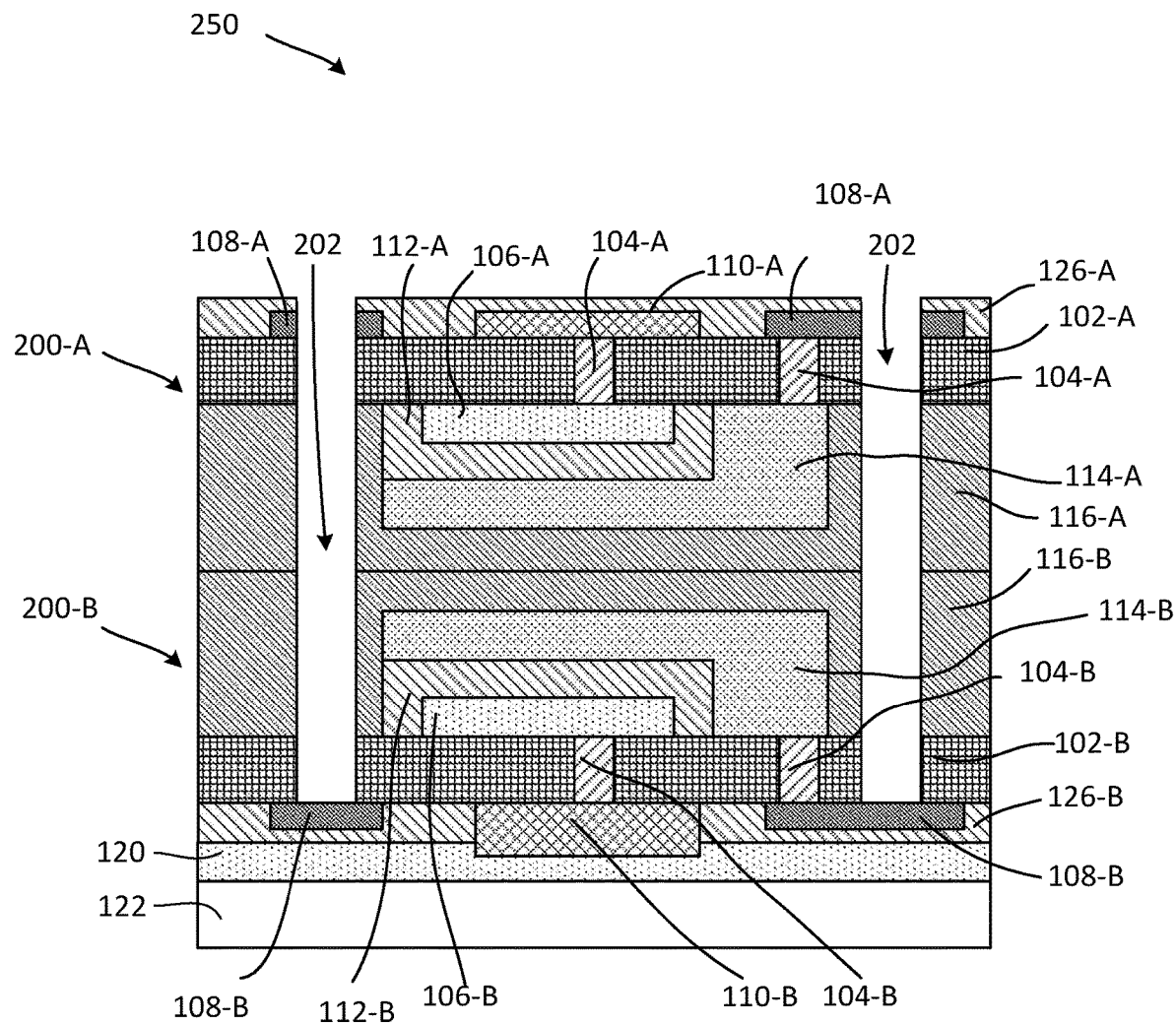
FIG. 2D is a cross-sectional view of the multi-layer micro-battery device of FIG. 2C after additional fabrication operations, according to embodiments.

Referring now to FIG. 2D, trenches 202 are formed by, for example, a laser milling process using the second battery stack metal layer 108-B as a stop layer (i.e., the removal of the layers is stopped when the laser reaches the second battery stack metal layer 108-B). It should be appreciated that because the openings 202 were provided in the first battery stack metal layer 108-A, the first battery stack metal layer 108-A is not an impediment to the laser milling process. Thus, the laser milling removes all of the material of both the first battery stack 200-A and the second battery stack 200-B down to the level of the second battery stack metal layer 108-B.

Figure 2E:
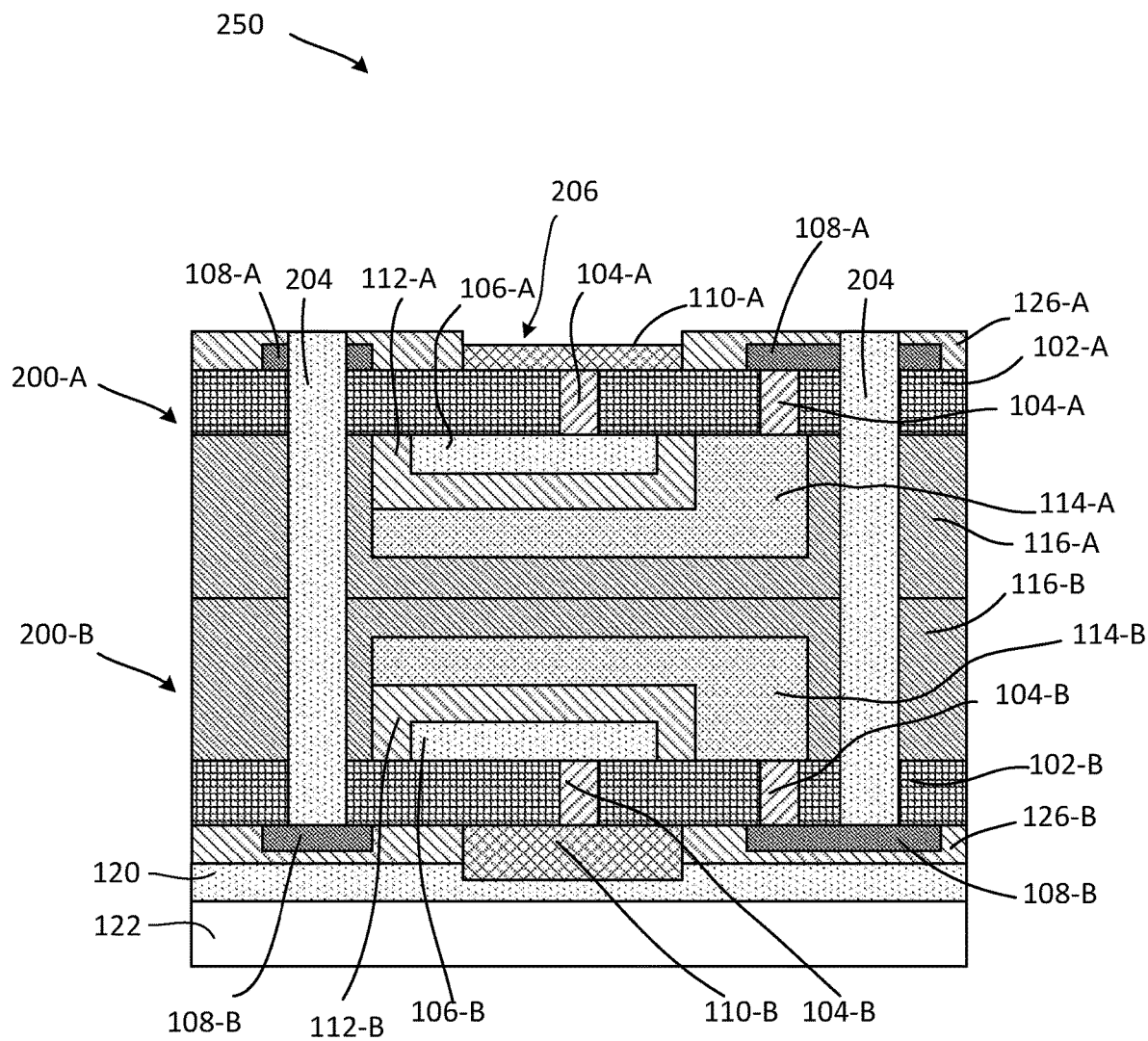
FIG. 2E is a cross-sectional view of the multi-layer micro-battery device of FIG. 2D after additional fabrication operations, according to embodiments.

Referring now to FIG. 2E, a metal seal 204 is formed to fill in the trenches 202. Thus, the metal seal 204 covers and hermetically seals the entire side surfaces of both the first battery stack 200-A and the second battery stack 200-B. In certain embodiments, the metal seal 204 is formed by injection molded soldering (IMS), where the molten solder is directly injected into the trenches 202. As shown in FIG. 2E, the metal seal 204 provides an electrically conductive path to connect the right side of the first battery stack metal layer 108-A with the right side of the second battery stack metal layer 108-B. For this example of a parallel battery connection with the cathodes 108A and 108B electrically connected, and with a parallel connection of anodes 110A and 110B, the same voltage but increased storage capacity is obtained when compared to a single battery. Also, the metal seal 204 provides an electrically conductive path to connect the perimeter/left/anode electrical connection in this example of the first battery stack metal layer 108-A with the perimeter/left/anode electrical connection of the second battery stack metal layer 108-B. As also shown in FIG. 2E, a second opening 206 is formed into the first battery stack insulating layer 126-A to expose the first battery stack anode 110-A.

Figure 2F:
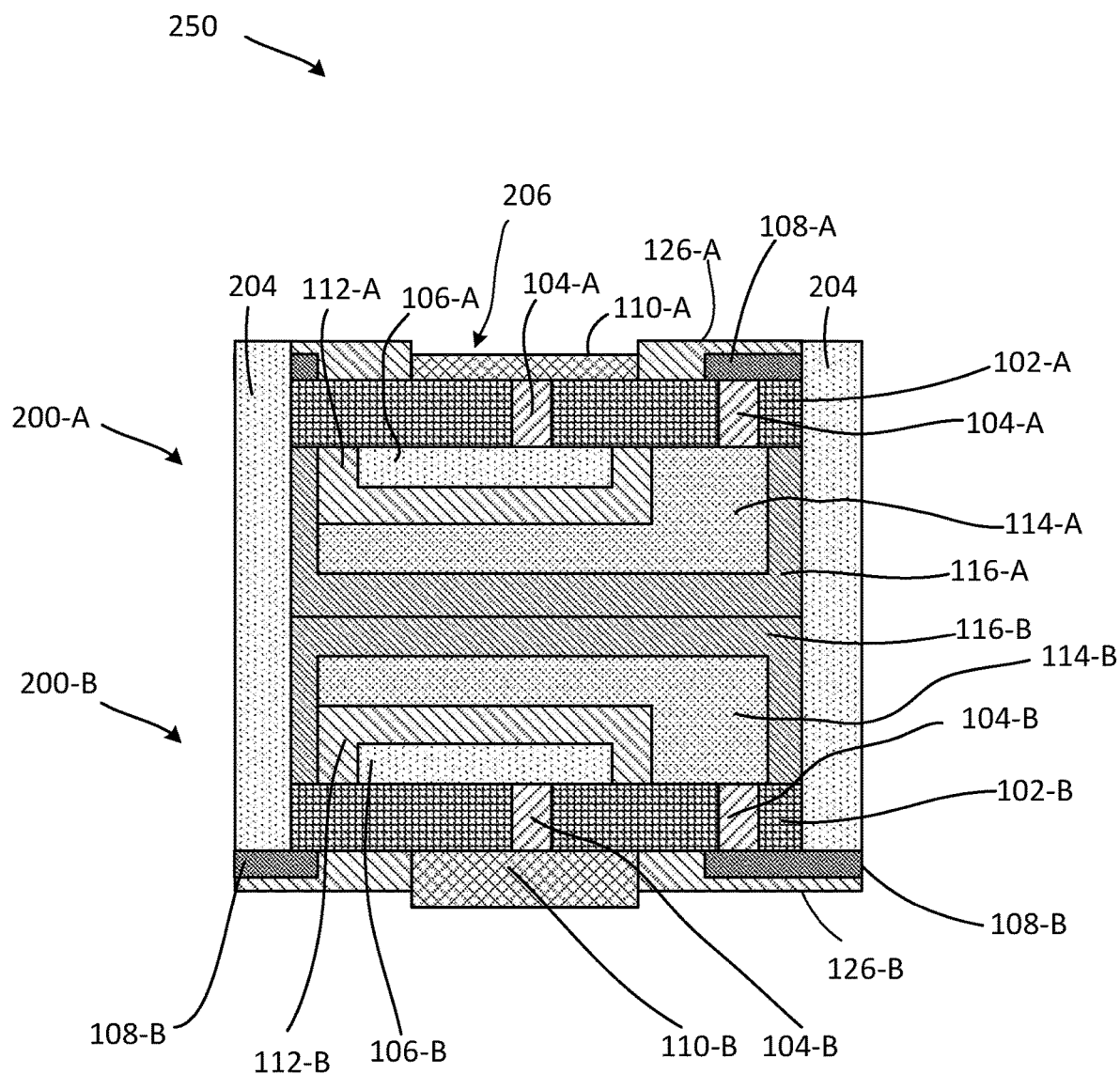
FIG. 2F is a cross-sectional view of the multi-layer micro-battery device of FIG. 2E after additional fabrication operations, according to embodiments.

Referring now to FIG. 2F, the handler substrate 122 and adhesive layer 120 are removed to expose the second battery stack anode 110-B. Also, singulation is performed to produce the individual micro-battery 250 devices.

Figure 2G:
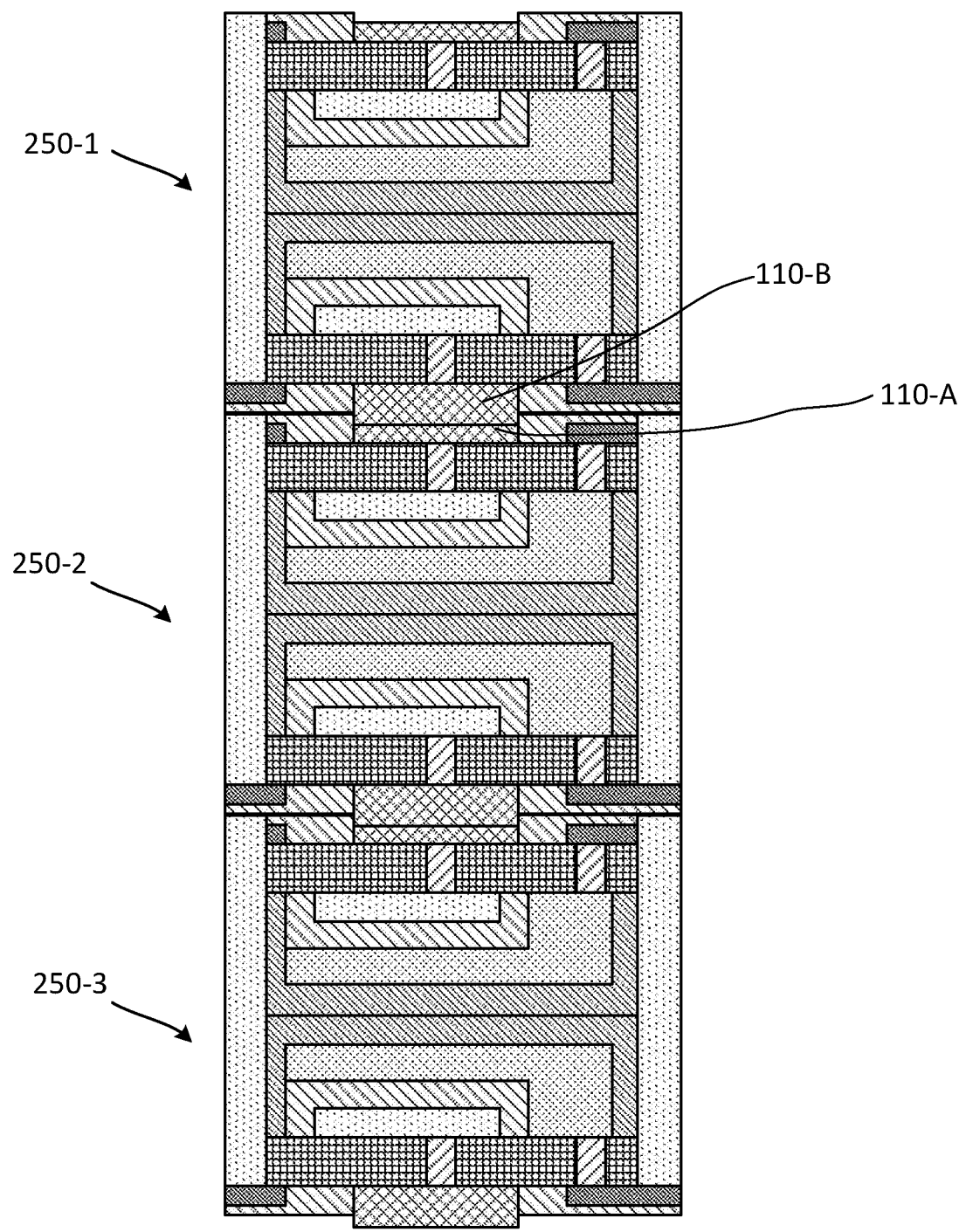
FIG. 2G is a cross-sectional view of several of the multi-layer micro-battery devices of FIG. 2F electrically connected in series, according to embodiments.

Referring now to FIG. 2G, three different micro-batteries 250-1, 250-2 and 250-3 are shown to be connected. Depending upon the targeted application, stacked battery structures of two high batteries and associated interconnections between the batteries may be in parallel for the same voltage, but with larger storage capacity (e.g., both of the cathodes are connected to an external wire and both of the anodes are connected to an external wire) or in series for higher voltage at same capacity (e.g., the external wire is connected to the cathode of the first battery, the anode of the first battery is connected to the cathode of the second battery, and the anode of the second battery is connected to the external wire). Similarly, for multi-high batteries of, for example, three or four or more batteries, the structures for integration and interconnections may permit structures of micro-batteries for multi-batteries in parallel, multi-batteries in series, or a combination of in-series and in-parallel configurations. In certain embodiments, such as for parallel interconnected battery stacks, the battery stack anode 110-B of a first micro-battery 250-1 contacts the battery stack anode 110-A of the second micro-battery 250-2 and the second cathode contact (i.e., the first metal layer 108) of a first micro-battery 250-1 contacts the battery stack cathode (i.e., the first metal layer 108) of the second micro-battery 250-2. Although not illustrated in FIG. 2G, the same type of parallel electrical connection occurs between the second micro-battery 250-2 and the third micro-battery 250-3. Alternatively, a series interconnection stack of micro-batteries could also be constructed with interconnection from cathode to anode between first micro-battery 250-1 and second micro-battery 250-2 and also from cathode to anode between second micro-battery 250-2 and third micro-battery 250-3.

Figure 3A:
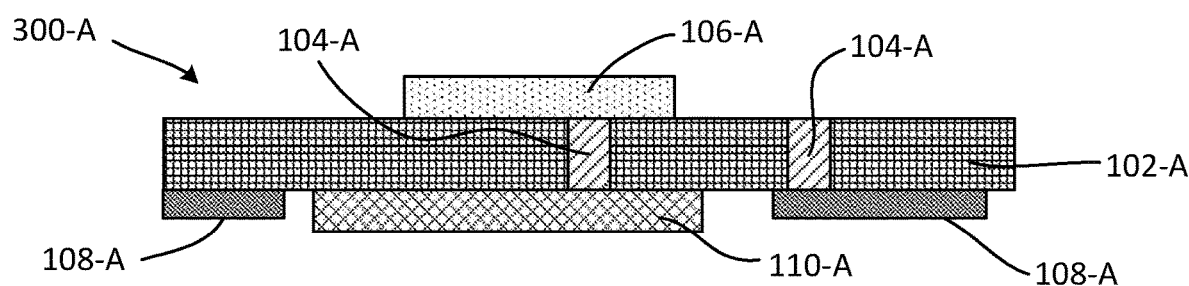
FIG. 3A is a cross-sectional view depicting a first single layer of a multi-layer micro-battery device at an intermediate stage of the manufacturing process, according to embodiments.
Figure 3B:
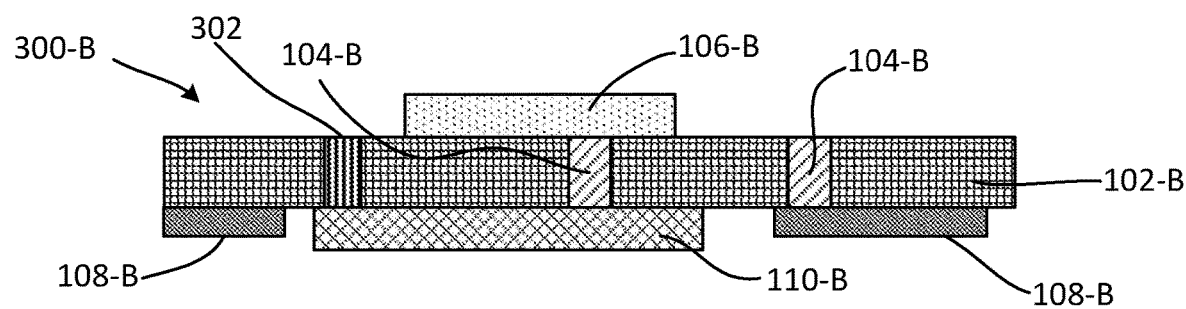
FIG. 3B is a cross-sectional view of a second single layer of the multi-layer micro-battery device of FIG. 3A, according to embodiments.

Referring now to FIGS. 3A-3F, and initially to FIGS. 3A and 3B, an embodiment of a two layer integrated solid state micro-battery is shown. The micro-battery stacks 300-A and 300-B shown in FIGS. 3A and 3B, respectively, are shown in an intermediate stage of the manufacturing process, and they are similar to the micro-battery 100 shown in FIG. 1C in most respects. Thus, the description of the manufacturing steps of FIGS. 1A-1C will not be repeated for these embodiments. One difference between the micro-battery stacks 300-A and 300-B and the micro-battery 100 of FIG. 1C is that the sizes and relative positions of the anode and anode current collectors are different. In particular, the first battery stack anode 110-A and the second battery stack anode 110-B are larger and/or extend further to the left than the leftmost side of the first battery stack anode current collector 106-A and the second battery stack anode current collector 106-B, respectively. This somewhat modified structure of the micro-battery stacks 300-A and 300-B allows for the connection of two different battery stacks, as described below with respect to FIG. 3C. Also, as shown in FIG. 3B, a metal interconnect 302 is formed through the second battery stack substrate 102-B and contacts the second battery stack anode 110-B. Also, the entirety of the metal interconnect 302 is formed to the left of the leftmost side of the first battery stack anode current collector 106-A and the second battery stack anode current collector 106-B.

Figure 3C:
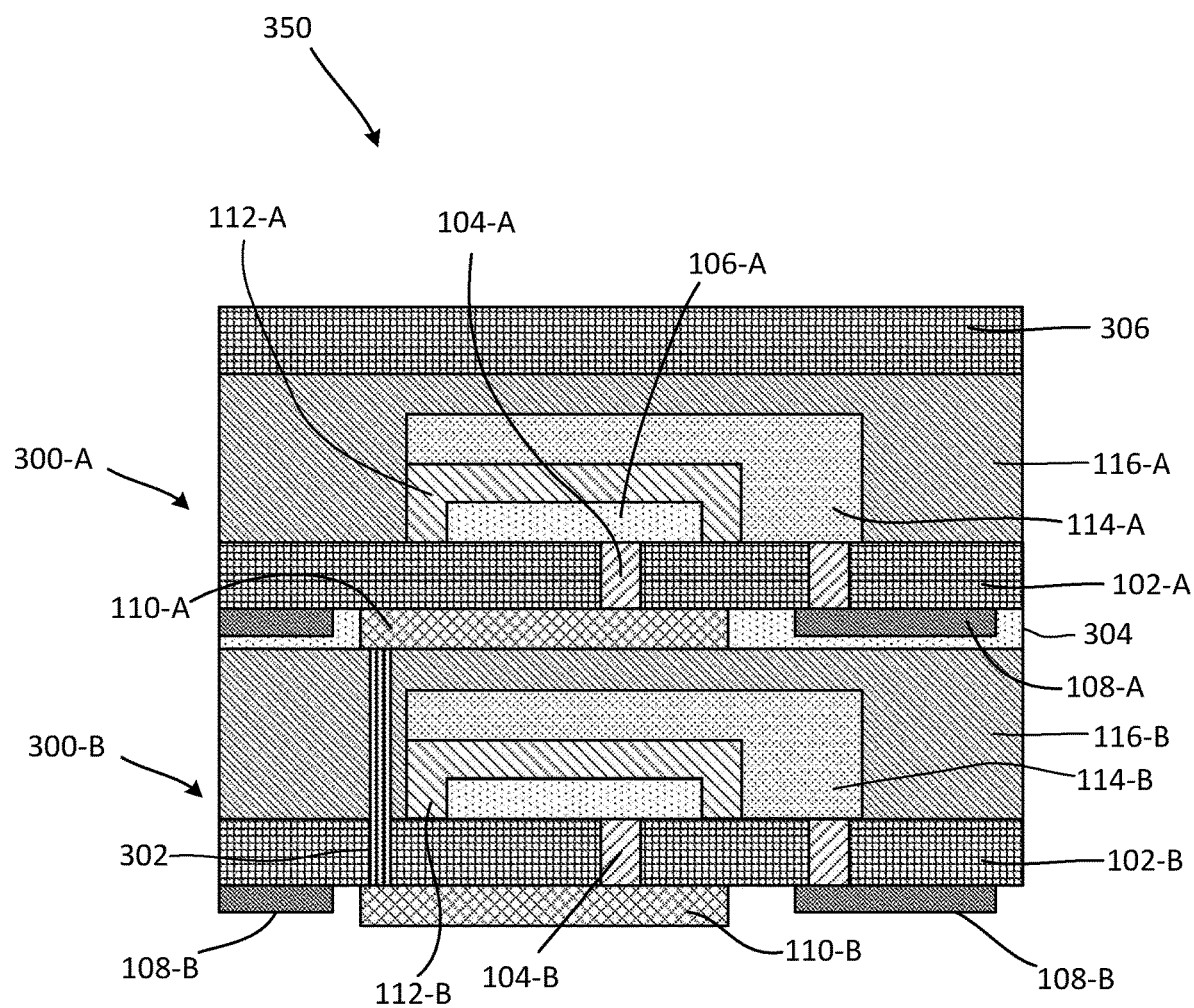
FIG. 3C is a cross-sectional view of the combination of the first and second layers of the micro-battery device of FIGS. 3A and 3B after additional fabrication operations, according to embodiments.

Referring now to FIG. 3C, a first micro-battery stack 300-A is joined to a second micro-battery stack 300-B to form a micro-battery 350. The first micro-battery stack 300-A includes a first battery stack substrate 102-A, first battery stack vias 104-A, a first battery stack anode current collector 106-A, a first battery stack metal layer 108-A, a first battery stack anode 110-A, a first battery stack battery element 112-A, a first battery stack cathode current collector 114-A, a first battery stack encapsulating layer 116-A, and a first battery stack insulating layer 304. Somewhat similarly, the second micro-battery stack 200-B includes a second battery stack substrate 102-B, second battery stack vias 104-B, a second battery stack anode current collector 106-B, a second battery stack metal layer 108-B, a second battery stack anode 110-B, a second battery stack battery element 112-B, a second battery stack cathode current collector 114-B, and a second battery stack encapsulating layer 116-B. As also shown in FIG. 3C, a top substrate 306 is formed on the top side of the first battery stack 300-A (i.e., formed on the first battery stack encapsulating layer 116-A. Moreover, the metal interconnect 302 described above with respect to FIG. 3B extends all the way up to the lower surface of the first battery stack anode 110-A, thereby electrically connecting the first battery stack anode 110-A to the second battery stack anode 110-B. This configuration permits a stacked micro-battery with parallel connection of micro-batteries with anode to anode interconnections and cathode to cathode interconnections.

Although not shown in the figures, a shift in the location of the first metal layer 108, the via 104, the anode via (i.e., the metal interconnect 302), and the anode 110 (i.e., the pad) in a stack of two or more batteries may permit anode to cathode connections in a stack of micro-batteries. This type of connection may provide a series interconnected battery configuration along with, and avoidance of, electrical interconnection of perimeter interconnection (i.e., trenches 308 to first metal layer 108) contacts by means of a dielectric layer (or through the absence of a cathode connection to the metallic seal).

Figure 3D:
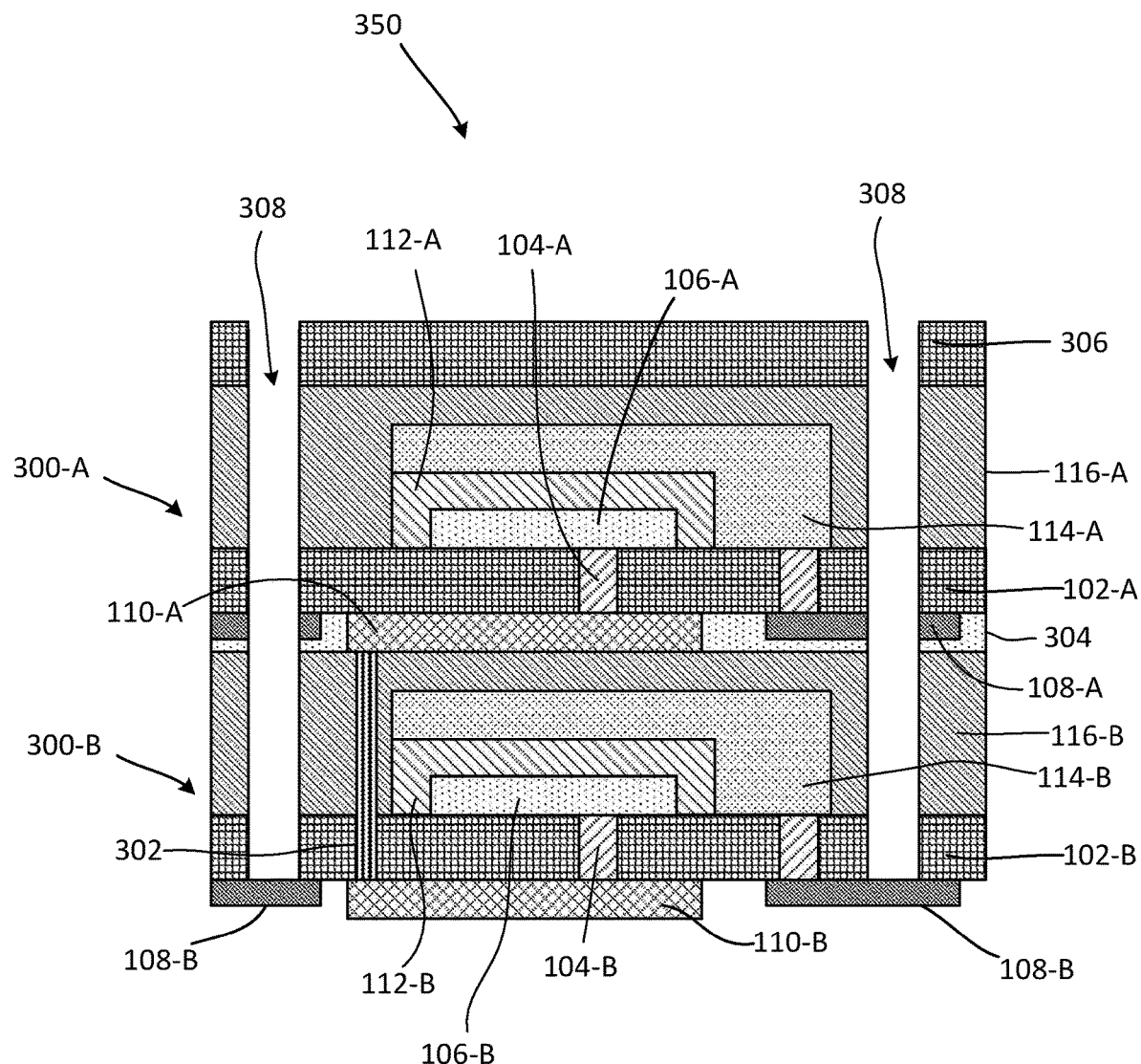
FIG. 3D is a cross-sectional view of the multi-layer micro-battery device of FIG. 3C after additional fabrication operations, according to embodiments.

Referring now to FIG. 3D, trenches 308 are formed by, for example, a laser milling process using the second battery stack metal layer 108-B as a stop layer (i.e., the removal of the layers is stopped when the laser reaches the second battery stack metal layer 108-B). Thus, the laser milling removes all of the material of both the first battery stack 300-A and the second battery stack 300-B down to the level of the second battery stack metal layer 108-B.

Figure 3E:
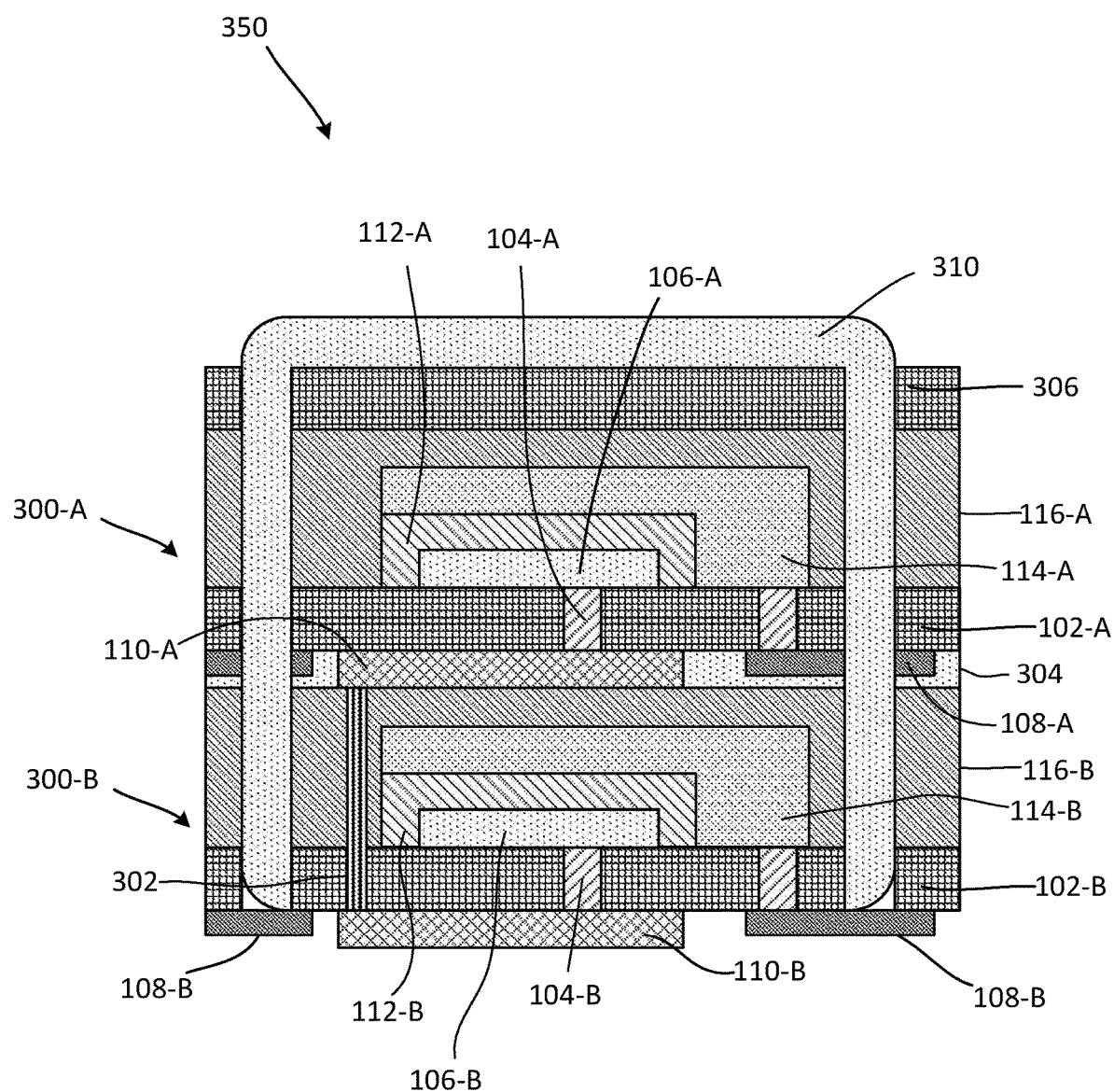
FIG. 3E is a cross-sectional view of the multi-layer micro-battery device of FIG. 3D after additional fabrication operations, according to embodiments.

Referring now to FIG. 3E, a metal seal 310 is formed to fill in the trenches 308 and on top of the top substrate 306. Thus, the metal seal 310 covers and hermetically seals the entire side surfaces as well as the top surface of the multi-stack micro-battery 350 device. In certain embodiments, the metal seal 310 is formed by injection molded soldering (IMS), where molten solder is directly injected into the trenches 308. As shown in FIG. 3E, the metal seal 310 contacts both the right and left sides of the first battery stack metal layer 108-A and the second battery stack metal layer 108-B. Therefore, the metal seal 310 electrically connects the first battery stack cathode current collector 114-A to the second battery stack cathode current collector 114-B. It could be considered that the cathode includes both the right and left sides of the first battery stack metal layer 108-A and second battery stack metal layer 108-B, as well as the metal seal 310. Thus, the top portion of the metal seal 310 (i.e., the portion covering the top substrate 306) functions as a cathode on the top side of the multi-stack micro-battery 350, and the exposed portion of the anode (i.e., the second battery stack anode 110-B) is on the bottom side of the micro-battery 350. Having the cathode and the anode on opposite sides of the micro-battery 350 can facilitate a less complicated series connection of multiple micro-batteries 350, similar to what was described in detail with respect to FIG. 1J above.

Figure 3F:
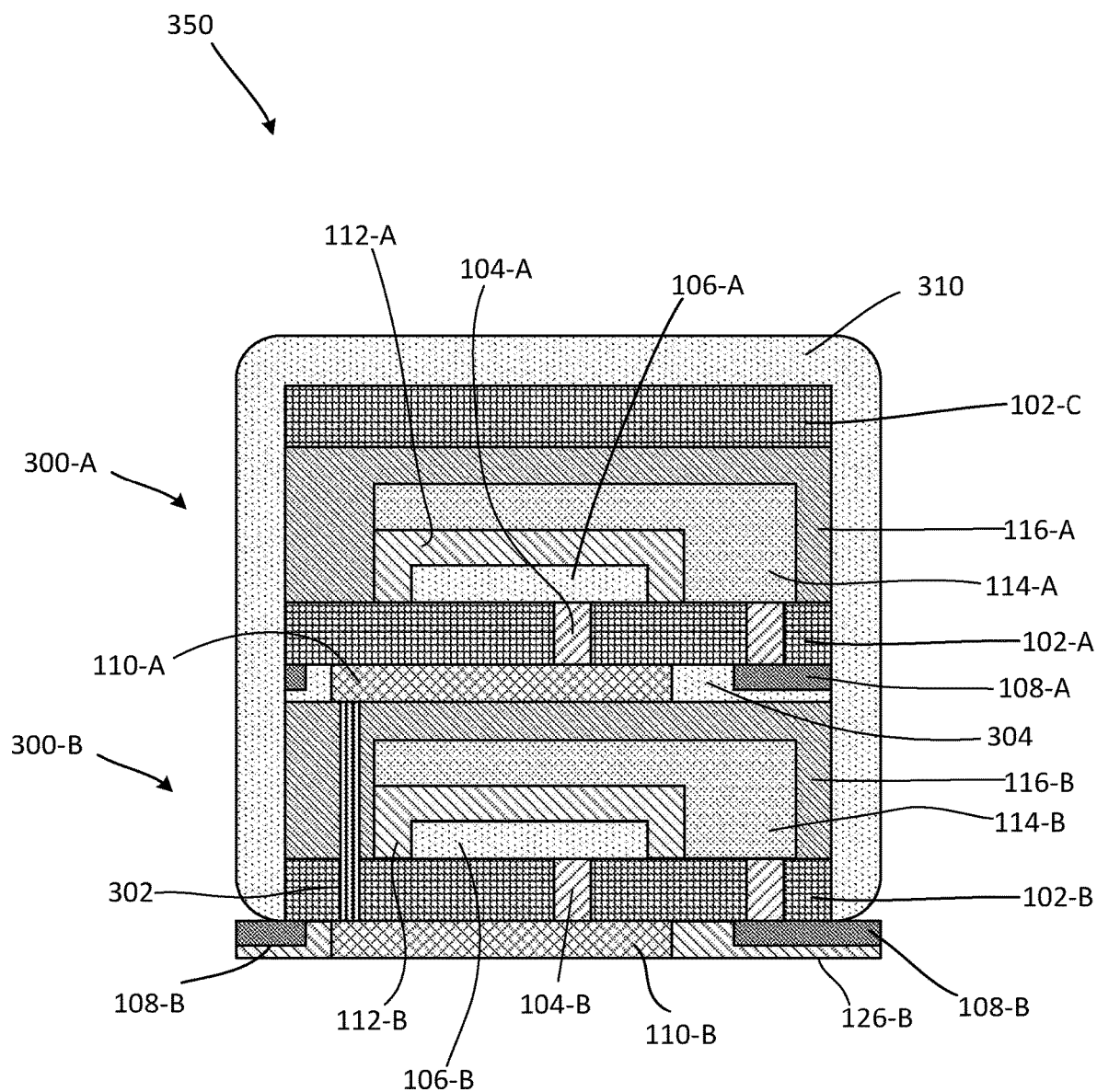
FIG. 3F is a cross-sectional view of the multi-layer micro-battery device of FIG. 3E after additional fabrication operations, according to embodiments.

Referring now to FIG. 3F, singulation is performed to create a plurality of individual micro-batteries 350, and a polymer insulation layer 126-B is provided between the second battery stack anode 110-B and the second battery stack metal layer 108-B to electrically isolate the anode and cathode. The process of singulation is similar to what was described above with respect to the embodiments of FIGS. 1A-1K and FIGS. 2A-2G.

The metal seals of the various embodiments described above provide a hermetic seal for multiple sides (i.e., the sidewalls and the top side) of the micro-battery device. This metal seal package enables the battery device to have a higher mechanical strength while allowing for a smaller sealing width (e.g., less than a 30 µm width for the sidewalls of the metal seal). This results in a smaller form factor relative to existing micro-battery devices. Moreover, by providing the anode and the cathode on different sides (e.g., top and bottom) of the micro-battery device, this allows for simplification of the series/parallel connection of multiple batteries. In addition, the hermetic metal seal may enable a longer shelf life of the micro-battery (e.g., less than 3% energy loss per year).

The descriptions of the various embodiments have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A micro-battery apparatus comprising:
   a first micro-battery device including
      a first substrate including a first metal anode via and a first metal cathode via,
      a first battery element formed on the first substrate, the first battery element including a first cathode current collector, a first anode current collector, a first cathode and a first anode, wherein the first cathode current collector is electrically connected to the first cathode through the first metal cathode via, and wherein the first anode current collector is electrically connected to the first anode through the first metal anode via, and
      a metal sealing layer formed on at least sidewall surfaces of the first battery element, wherein the metal sealing layer is electrically connected to the first cathode.

2. The micro-battery apparatus of claim 1, wherein the metal sealing layer is also formed on a top surface of the first battery element.

3. The micro-battery apparatus of claim 1, further comprising:
   an encapsulating layer covering the first cathode current collector; and
   a second substrate covering the encapsulating layer.

4. The micro-battery apparatus of claim 3, wherein the encapsulating layer is formed between the metal sealing layer and the sidewall surfaces of the first battery element, and the second substrate is formed between the metal sealing layer and the top surface of the first battery element.

5. The micro-battery apparatus of claim 1, further comprising
   a second micro-battery device including
      a second battery element formed on the first battery element, the second battery element including a second cathode current collector, a second anode current collector, a second cathode and a second anode, and
      a second substrate including a second metal anode via and a second metal cathode via, wherein the second cathode current collector is electrically connected to the second cathode through the second cathode via, and wherein the second anode current collector is electrically connected to the second anode through the second anode via,
   wherein the metal sealing layer is formed on the sidewall surfaces of the first battery element and sidewall surfaces of the second battery element, and
   wherein the metal sealing layer is electrically connected to the first cathode and the second cathode.

6. The micro-battery apparatus of claim 5, wherein the second battery element is inverted relative to the first battery element.

7. The micro-battery apparatus of claim 1, further comprising a plurality of the first micro-battery devices connected in series or connected in parallel.

8. A micro-battery apparatus comprising:
   a micro-battery device including
      a first substrate including a first metal anode via and a first metal cathode via,
      a first battery element formed on the first substrate, the first battery element including a first cathode current collector, a first anode current collector, a first cathode and a first anode, wherein the first cathode current collector is electrically connected to the first cathode through the first metal cathode via, and wherein the first anode current collector is electrically connected to the first anode through the first anode via,
      a second substrate formed on the first battery element and including a second metal anode via and a second metal cathode via, and
      a second battery element formed on the second substrate, the second battery element including a second cathode current collector, a second anode current collector, a second cathode and a second anode, wherein the second cathode current collector is electrically connected to the second cathode through the second cathode via, and wherein the second anode current collector is electrically connected to the second anode through the second anode via, a metal interconnect that electrically connects the first anode to the second anode, and a metal sealing layer formed on sidewall surfaces of the first and second battery elements, wherein the metal sealing layer is electrically connected to the first cathode and the second cathode.

9. The micro-battery apparatus of claim 8, wherein the metal sealing layer is also formed on a top surface of the second battery element.

10. The micro-battery apparatus of claim 8, further comprising:

a first encapsulating layer covering the first cathode current collector, the second substrate formed on the encapsulating layer;

a second encapsulating layer covering the second cathode current collector; and a third substrate formed on the second encapsulating layer.

11. The micro-battery apparatus of claim 8, wherein the second battery element is electrically connected in series with the first battery element.

12. The micro-battery apparatus of claim 8, further comprising a plurality of the micro-battery devices connected in series or connected in parallel.

13. A method of manufacturing a micro-battery apparatus, the method comprising:

forming a micro-battery device by
forming a first metal anode via and a first metal cathode via in a first substrate,
forming a first metal layer on a bottom side of the first substrate,
forming a first battery element on a top side of the first substrate,
forming an encapsulation layer around the first battery element,
forming trenches through the encapsulation layer and the first substrate on different sides of the first battery element, and
forming a metal sealing layer in the trenches to cover at least a plurality of sidewall surfaces of the first battery element, wherein the metal sealing layer is electrically connected to the battery element through the first metal layer and the first metal cathode via.

14. The method of claim 13, wherein forming the first battery element includes:

forming a first cathode current collector;

forming a first battery on the first cathode current collector;

forming a first anode current collector on the first battery;

wherein the first cathode current collector is electrically connected to the first cathode through the first metal cathode via, and wherein the first anode current collector is electrically connected to the first anode through the first metal anode via.

15. The method of claim 13, wherein the metal sealing layer is also formed on a top surface of the first battery element.

16. The method of claim 15, further comprising electrically connecting a plurality of the micro-battery devices in series.

17. The method of claim 16, wherein the plurality of micro-battery devices are connected in a stacked configuration.

18. The method of claim 15, further comprising electrically connecting a plurality of the micro-battery devices in parallel, wherein the plurality of micro-battery devices are connected in a stacked configuration.

19. The method of claim 13, further comprising forming a plurality of the micro-battery devices in a two-dimensional array.

20. The method of claim 19, further comprising separating the micro-battery devices from each other with a laser milling singulation process.

* * * * *